Feb. 16, 1943.     H. C. JOHANSEN     2,310,960
CHUCK MECHANISM
Filed Aug. 27, 1941     3 Sheets-Sheet 1
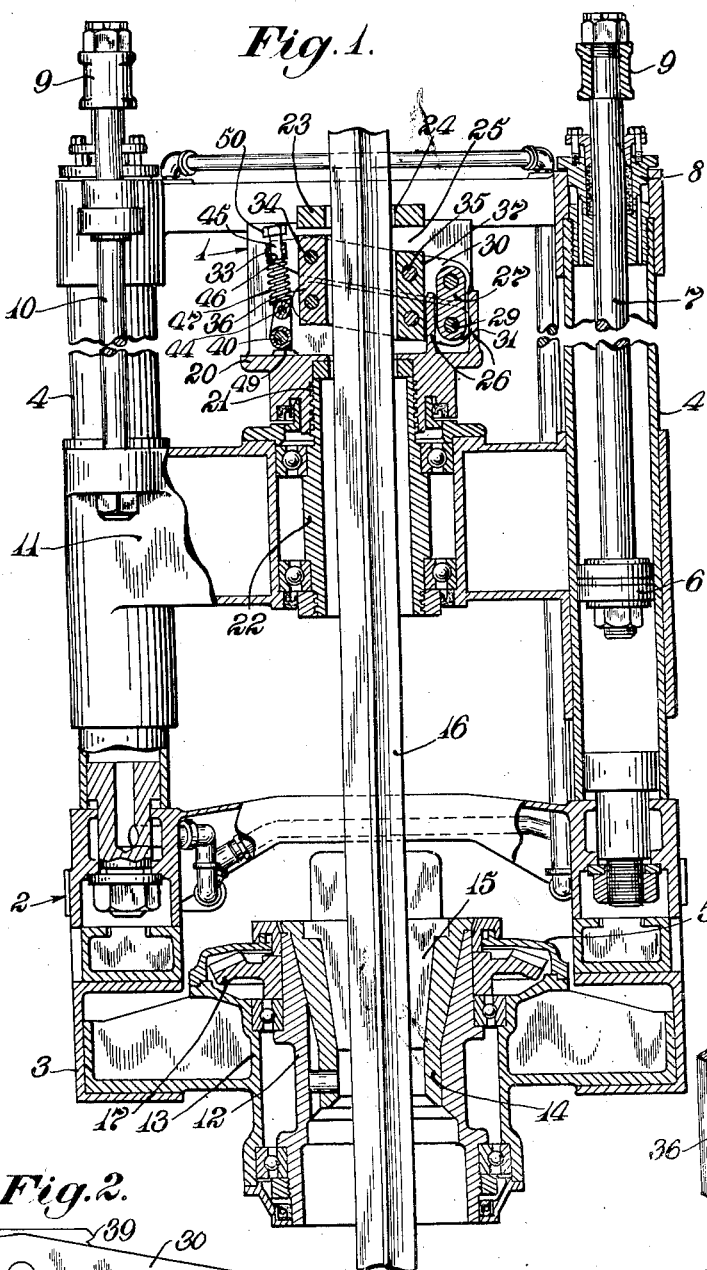
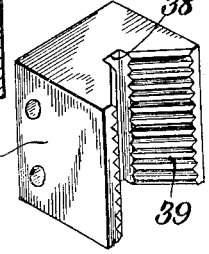
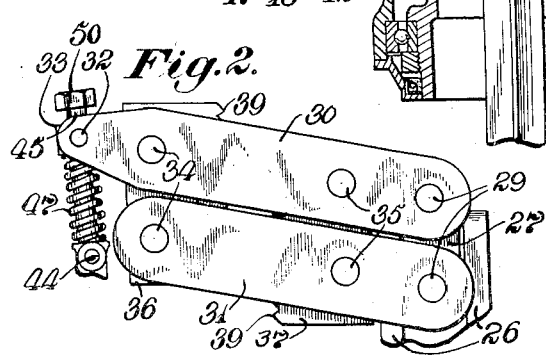
Inventor:
Harry C. Johansen
by Louis A. Maxom
Atty.

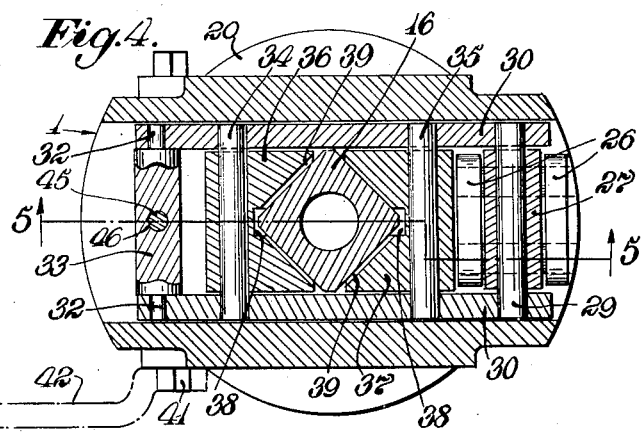
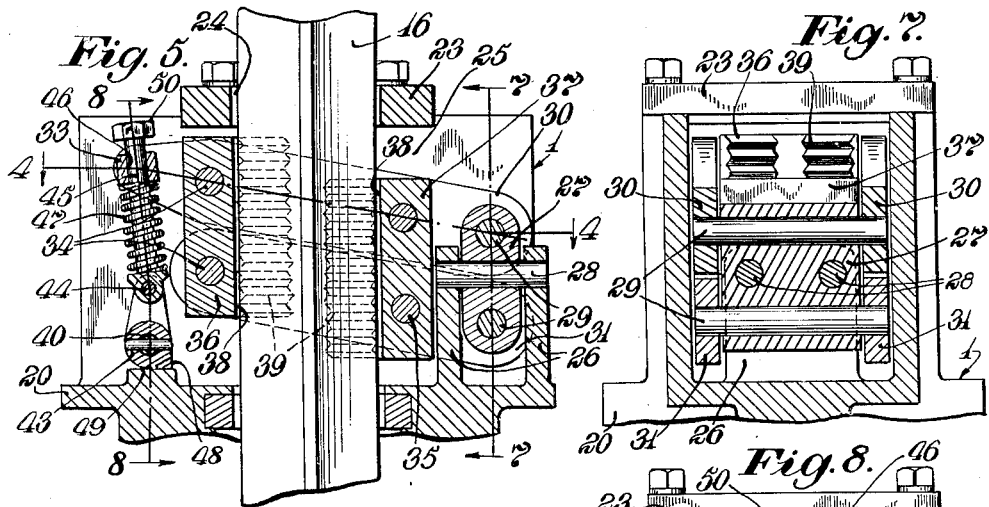
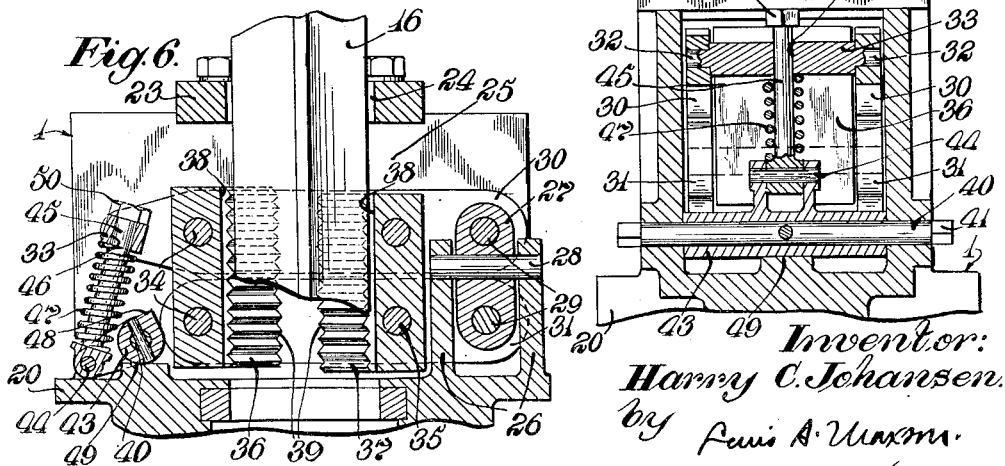

Feb. 16, 1943. H. C. JOHANSEN 2,310,960
CHUCK MECHANISM
Filed Aug. 27, 1941 3 Sheets-Sheet 3
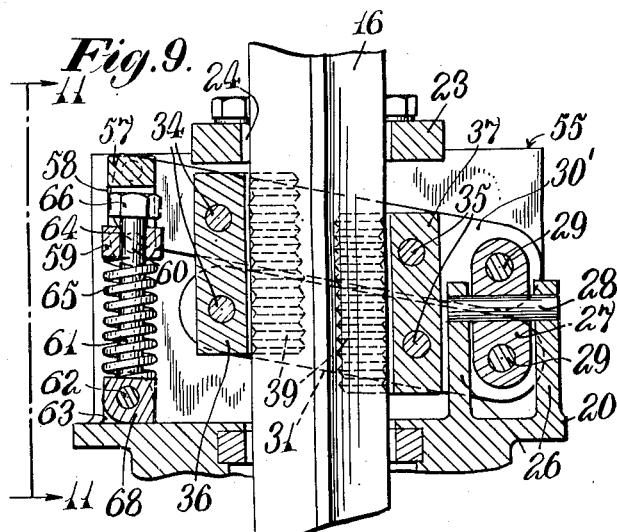
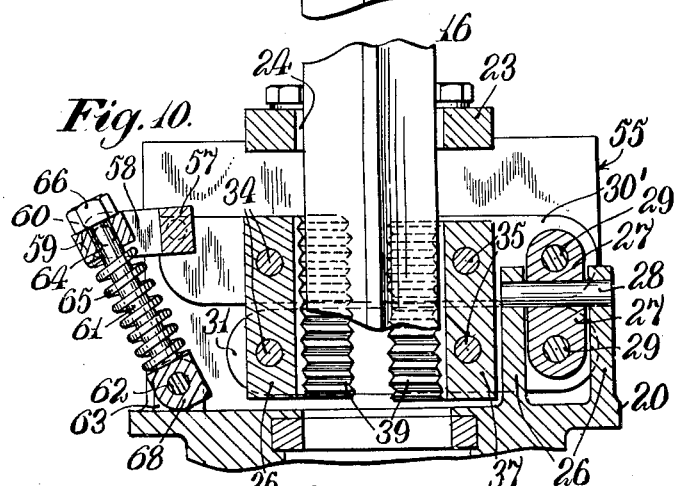
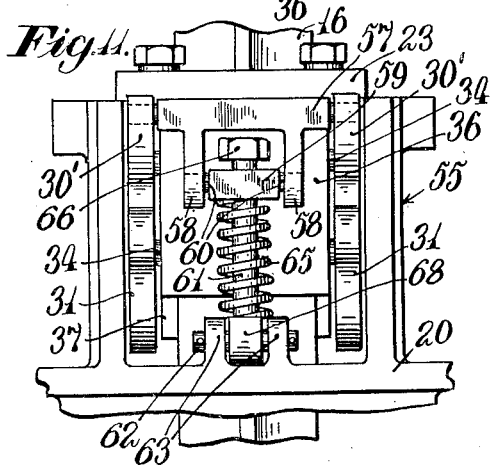
Inventor:
Harry C. Johansen.
by
Louis A. Maxson.
Atty.

Patented Feb. 16, 1943

2,310,960

UNITED STATES PATENT OFFICE 2,310,960

CHUCK MECHANISM

Harry C. Johansen, Michigan City, Ind., assignor to Sullivan Machinery Company, a corporation of Massachusetts Application August 27, 1941, Serial No. 408,440

20 Claims. (Cl. 24—249)

This invention relates to chuck mechanisms, and more particularly to improvements in an automatic chuck mechanism especially, but not exclusively, designed for use with rotary drilling apparatus.

An object of the present invention is to provide an improved chuck mechanism. Another object is to provide an improved automatic chuck mechanism having novel operating means. A further object is to provide an improved automatic chuck mechanism associated with the feeding means of a rotary drilling apparatus and having novel operating means whereby during feed in one direction the chuck is automatically applied and during feed in the opposite direction the chuck is automatically released. A still further object is to provide an improved jaw supporting and operating means for a chuck. How these and other objects are accomplished, and the advantageous features of the invention, will be best understood from the following detailed description wherein a preferred form and a modification thereof are set forth, reference for the purpose being had to the accompanying drawings, in which:

Fig. 1 is a view in vertical section, with parts in side elevation, taken through a rotary drilling apparatus with which the improved automatic chuck is associated and showing the chuck structure in detail.

Fig. 2 is a fragmentary side elevational view showing the parallel links and portions of the chuck jaws and their operating means.

Fig. 3 is a perspective view of one of the chuck jaws.

Fig. 4 is a sectional view taken substantially on line 4—4 of Fig. 5.

Fig. 5 is a vertical sectional view taken substantially on line 5—5 of Fig. 4.

Fig. 6 is a sectional view similar to Fig. 5 showing the chuck jaws in their released position.

Fig. 7 is a cross sectional view taken substantially on line 7—7 of Fig. 5.

Fig. 8 is a cross sectional view taken substantially on line 8—8 of Fig. 5.

Fig. 9 is a vertical sectional view similar to Fig. 5 showing a modification of the improved chuck.

Fig. 10 is a view similar to Fig. 9 showing the chuck jaws in their released position.

Fig. 11 is a side elevational view taken on the plane of the line 11—11 of Fig. 9.

In the embodiment of the invention shown in Figs. 1 to 8 the improved automatic chuck mechanism, generally designated 1, is shown associated with a rotary drilling apparatus, generally designated 2, which, for purposes of illustration, may be of the same general type as that disclosed in a copending application of one H. H. Vanderzee, Serial No. 275,235, filed May 23, 1939. It will be evident, however, that the improved chuck mechanism may be associated with various other types of apparatus.

The drilling apparatus 2 comprises a supporting frame structure 3 having mounted thereon parallel upright hydraulic feed cylinders 4, 4, and a rotary table 5 is arranged between the feed cylinders near their lower ends. The feed cylinders contain reciprocable feed pistons 6 having their piston rods 7 extending upwardly through the top packed heads 8 of the cylinders. The piston rods are secured at their upper ends to cross yokes 9, and connecting rods 10 extending longitudinally along the sides of the feed cylinders connect these cross yokes to a crosshead 11 extending between and slidably guided on the feed cylinders. This sliding crosshead carries the automatic chuck mechanism 1, as will later be explained. The rotary table 5 comprises a rotary member 12 journaled within bearings supported within a casing 13 and having a bushing 14 which receives slips 15 engageable with a drill stem or kelly 16 of a conventional design. This drill stem is preferably square in cross section (although it may obviously assume various other shapes) and the slips 15 are engageable with the flats of the stem so that the latter may be rotated as it moves axially through the table. The table is driven by a bevel gear 17. Upon movement of the feed pistons 6 within the feed cylinders in a direction to feed the drill stem toward the work, the chuck mechanism 1, whose details will shortly be described, acts automatically to grip the drill stem, and upon reverse movement of the feed pistons within the feed cylinders the chuck mechanism is automatically released. When the chuck mechanism is released, the drill stem may be held against downward movement either by the slips of the rotary table or by the cable of a conventional drill hoisting mechanism, attached in a usual manner to the upper end of the drill stem.

Now referring more specifically to the improved automatic chuck mechanism 1, it will be noted that a chuck casing 20 is mounted on the top of the crosshead between the feed cylinders, in the manner shown in Fig. 1, and is secured at 21 to a sleeve 22, the latter being journaled within thrust bearings supported within the crosshead.

The drill stem passes centrally through this sleeve and through the chuck mechanism in the manner shown. Attached by screws to the top of the chuck casing is a plate 23 having a central opening 24 which receives the drill stem, and this plate provides a closure for the top of a chamber 25 in the casing. Arranged in this chamber, at one side thereof, between parallel wall portions 26 is a supporting block 27, the latter being slidably mounted on parallel pins 28 secured at their ends within the wall portions 26. The block 27 has limited sliding movement along the pins 28 between the inner surfaces of the wall portions 26. The block 27 carries parallel pivot pins 29 on the projecting ends of which are pivotally connected one end of pairs of parallel links or arms 30, 31. These links extend along the opposite sides of the chamber, and the upper pair of links 30 are pivotally connected at their opposite ends by pivot pins 32 which are integral with and connected together by a cross block 33 (Fig. 4). The pairs of parallel links carry pairs of parallel pins 34 and 35 which support chuck jaws 36 and 37 respectively, and the several pairs of pins are equally spaced so that the links are maintained parallel in all positions about their pivots. The block 27 is slidable in and out along the guide pins 28 to allow freedom of movement of the jaws 36, 37 so as to keep the jaws in substantially centered position. The jaws 36, 37 are arranged in the chamber 25 between the links and have movement in a vertical direction within the chamber. Thus a parallel motion link structure is provided which maintains the jaws upright in all positions of the jaw operating means. These jaws may assume various forms but herein preferably each has a notched portion or V-shaped recess 38, the inclined walls of which are serrated at 39 to afford adequate gripping of the drill stem.

The jaw operating means includes a cross shaft 40 (Fig. 8) journaled within the chuck casing and having squared ends 41 for the reception of a suitable turning instrument, such as a wrench 42 indicated in construction lines in Fig. 4. This cross shaft has fixed thereto a crank member 43 pivotally connected by a pin 44 to the head of an eyebolt 45. The eyebolt and crank cooperate to provide a toggle. This eyebolt passes through and has a sliding fit with an opening 46 in the cross support 33. Interposed between the eyebolt head and the cross support 33 and encircling the bolt is a coil spring 47 which constantly urges the cross frame toward its uppermost position relative to the eyebolt. The hub of the crank member 43 has an integral lug 48 engageable with a plane surface 49 on the chuck casing for limiting swinging movement of the crank, thereby to hold the parts in the position shown in Fig. 5 with the pivot point between the crank and eyebolt slightly past center to prevent unintentional release of the jaws. When the parts are in the position shown in Fig. 5 with the chuck mechanism applied, the coil spring yieldingly urges the chuck jaws into engagement with the drill stem, and when the crank arm is swung into the position shown in Fig. 6, a nut 50 on the eyebolt engages the cross support 33 to hold the jaws in released position out of engagement with the drill stem.

The general mode of operation of the improved chuck mechanism is as follows. When the parts are in the position shown in Figs. 1 and 5, with the chuck jaws in gripping position, and liquid under pressure is supplied to the upper ends of the feed cylinders 4, the feed pistons 6 are moved downwardly, thereby to move the crosshead 11 downwardly along the feed cylinders, and the chuck jaws at that time automatically grip the drill stem or kelly 16 with a toggle action, thereby to effect feed of the drill stem through the rotary table. As the drill stem moves axially through the table bushing 14, it is rotated in a well known manner. When liquid under pressure is supplied to the lower ends of the feed cylinders, the feed pistons are moved upwardly, thereby moving the crosshead upwardly along the cylinders, and when the drill stem is suitably held by the table slips or the cable of the hoisting mechanism, or by the weight of the rod line, the chuck jaws are automatically released against the tension of the coil spring 47. When the feed pistons have been returned to the tops of the cylinders and it is again desired to feed the drill stem downwardly through the rotary table, liquid under pressure is again supplied to the upper ends of the cylinders, thereby to cause the feed pistons to move downwardly, and as the crosshead is moved downwardly along the cylinders the chuck jaws automatically grip the drill stem to effect feed of the latter through the rotary table. The chuck jaws may be manually released at will simply by operating the crank member to throw the eyebolt and its associated parts from the position shown in Fig. 5 to that shown in Fig. 6. In this position of the parts, the force of the spring is exerted at its lower end on the head of the eyebolt 45 and at its upper end presses the cross support 33 against the nut 50, so that the spring exerts no force tending to move the jaws out of the position shown in Fig. 6. It may thus be noted that between the jaw supporting arms and the support for said arms there are provided devices for alternatively forcing said arms in a gripping direction and relieving them from such a force, such devices in the illustrative embodiment including a member swingably movable relative to the arms, a member swingably movable relative to the support and pivotally connected to the first member, and means providing for limited radial movement of one of said members including a spring and means for limiting the travel of said radially movable member.

In Figs. 9 to 11 there is shown a modified form of chuck mechanism, generally designated 55, which is like the preferred form except for the devices for forcing the jaw supporting arms in a gripping direction and for relieving them from such a force. In this modification, the upper parallel arms 30' have pivotally connected between them at their ends opposite their connections to the block 27, a transversely extending member 57 having projecting arm portions 58. Arranged between the outer ends of the arm portions is a cross block 59 having pivot pins 60 which are received within openings near the ends of the arm portions. An eyebolt 61 is pivotally supported at its head end by a pin 62 which extends through openings in flanges 63 formed on the chuck casing, and the bolt extends through an opening 64 in the block 59. Interposed between the eyebolt head and the block 59 is a coil spring 65 which constantly urges the block 59 toward its uppermost position relative to the eyebolt. A nut 66 threaded on the upper end of the eyebolt limits the upward movement of the block 59 relative to the eyebolt. The head of the eyebolt is provided with a projecting portion 68 which is engageable with a plane surface on the chuck casing for limiting the swinging movement of the eyebolt in a clockwise direction. When the eyebolt is swung in a clockwise direction to its extreme position, as shown in Fig. 9, the axis of the eyebolt lies slightly to the right of the line connecting the pivot points of the eyebolt head and the member 57, thereby holding the chuck jaws 36 and 37 in their gripping positions. When the jaws are in their gripping positions, the arm portions of the member 57 hold the block 59 in position to compress the spring 65 and provide some clearance between the block and the nut 66 so as to hold the jaws yieldingly in engagement with the drill stem 16. On swinging the eyebolt to the position shown in Fig. 10, the block 59 is forced upwardly by the spring into engagement with the nut 66, and the chuck jaws are released from the drill stem.

As a result of this invention it will be noted that an improved automatic chuck mechanism is provided which is automatically applied during feed of the drill stem in one direction and automatically released during feed of the drill stem in the opposite direction. It will further be evident that by the provision of the improved supporting structure for the chuck jaws and the particular jaw operating means, the chuck jaws effectually grip the drill stem and may be readily released as desired. Other modes of use and advantages of the invention will be clearly apparent to those skilled in the art.

While there are in this application specifically described a preferred form and a modification thereof which the invention may assume in practice, it will be understood that this form and modification of the same are shown for purposes of illustration only and that the invention may be further modified and embodied in various other forms without departing from its spirit or the scope of the appended claims.

What I claim as new and desire to secure by Letters Patent is:

1. In a chuck mechanism, a casing, a support mounted on said casing for limited movement with respect thereto, parallel links pivotally connected to said movable support, and chuck jaws pivotally connected to and supported by said parallel links, said link pivots and the points of pivotal connection between the links and jaws being so arranged as to provide for parallel motion movement of the jaws upon swinging of the links about their pivots.

2. In a chuck mechanism, a casing, a pair of parallel links pivotally mounted on said casing, a pair of chuck jaws having pivotal connection with and supported by said pair of links, one of said jaws being arranged on said links nearer the link pivots than the other and said link pivots and the points of pivotal connection between the links and jaws being so arranged as to provide for parallel motion movement of the jaws upon swinging of the links about their pivots, and jaw operating means connected to the end of at least one of the links remote from the link pivot for swinging said pair of links to move said jaws into and out of gripping position.

3. In a chuck mechanism, a casing, parallel links pivotally mounted on said casing, chuck jaws having pivotal connection with and supported by said links, said link pivots and the points of pivotal connection between the links and jaws being so arranged as to provide for parallel motion movement of the jaws upon swinging of the links about their pivots, and jaw operating means connected to the ends of certain of the links remote from the link pivots for swinging said links to move said jaws into and out of gripping engagement, said operating means including yieldable means for yieldingly holding said jaws in gripping position.

4. In a chuck mechanism, a casing, parallel links pivotally mounted on said casing, chuck jaws having pivotal connection with and supported by said links, said link pivots and the points of pivotal connection between the links and jaws being so arranged as to provide for parallel motion movement of the jaws upon swinging of the links about their pivots, and jaw operating means connected to the ends of certain of the links remote from the link pivots for swinging said links to move said jaws into and out of gripping position, said operating means including a toggle arrangement which, when parts thereof are in a predetermined out-of-alinement relation, hold said jaws in their gripping position.

5. In a chuck mechanism, a casing, parallel links pivotally mounted on said casing, chuck jaws having pivotal connection with and supported by said links, said link pivots and the points of pivotal connection between the links and jaws being so arranged as to provide for parallel motion movement of the jaws upon swinging of the links about their pivots, and jaw operating means connected to the ends of certain of the links remote from the link pivots for swinging said links to move said jaws into and out of gripping position, said operating means including a toggle arrangement which, when parts thereof are in a predetermined out-of-alinement relation, hold said jaws in their gripping position, said toggle arrangement including a pivoted toggle element, a member connected to certain of said links and having an opening through which said toggle element passes, and a spring encircling the toggle element and acting on said member for urging the latter to effect swinging of said links into a position to cause said jaws to grip.

6. In a chuck mechanism, a casing, means mounted on said casing providing a guideway at one side thereof, a support slidably mounted on said guideway for limited movement, parallel links pivotally connected to said support, and chuck jaws carried by said links.

7. In a chuck mechanism, a casing, means mounted on said casing providing a guideway at one side thereof, a support slidably mounted on said guideway for limited movement, parallel links pivotally connected to said support, chuck jaws carried by said links, and means operatively connected to at least one of said links for operating said jaws.

8. In a chuck mechanism, a casing, a link structure pivotally mounted on said casing, chuck jaws carried by said link structure, and means for swinging said link structure about its pivot to move said jaws into and out of their gripping position, said swinging means including a crank rotatably mounted on said casing, an eye-bolt having pivotal connection with said crank, a member operatively connected to said link structure and having an opening through which said eye-bolt passes, and a coiled spring encircling said eye-bolt and interposed between the bolt head and said member for urging said link structure toward a position to cause said jaws to grip.

9. In a chuck mechanism, a casing, a support guided on said casing for limited movement, a link structure pivotally connected at one end to said support, and chuck jaws carried by said link structure.

10. In a chuck mechanism, a casing, a support guided on said casing for limited movement, a link structure pivotally connected at one end to said support, chuck jaws carried by said link structure, and means operatively connected to said link structure at the end thereof remote from its pivoted end for swinging said link structure to move said jaws into and out of gripping position.

11. In a chuck mechanism, a casing, a support guided on said casing for limited movement, a link structure pivotally connected at one end to said support, chuck jaws carried by said link structure, and means operatively connected to said link structure at the end thereof remote from its pivoted end for swinging said link structure to move said jaws into and out of gripping position, said operating means including means for yieldingly holding said jaws in their gripping position.

12. In a chuck mechanism, a casing, a support guided on said casing for limited movement, a parallel motion link structure pivotally connected at one end to said support, and chuck jaws carried by said link structure.

13. In a chuck mechanism, a casing, a link structure pivotally mounted at one end on said casing, chuck jaws carried by said link structure, and jaw operating means operatively connected to the opposite end of said link structure for yieldingly urging said jaws toward gripping position, said jaws being releasable automatically upon swinging of said link structure against the action of said yieldable means.

14. In a chuck mechanism, a casing, a parallel motion link structure pivotally mounted at one end on said casing, chuck jaws carried by said link structure, and jaw operating means operatively connected to the opposite end of said link structure for yieldingly urging said jaws toward gripping position, said jaws being releasable automatically upon swinging of said link structure against the action of said yieldable means.

15. A chuck mechanism for connecting a drill stem to a feeding mechanism of a drilling apparatus, comprising chuck jaws mounted to grip the stem with a toggle action and held by yieldable means in engagement with the stem, said jaws being so arranged and constructed as to grip automatically the stem upon feed in one direction and automatically to release their grip on the stem upon feed in the reverse direction.

16. A chuck mechanism for connecting a drill stem to a feeding mechanism of a drilling apparatus, comprising chuck jaws mounted on a swingable link structure to grip the stem with a toggle action and held by yieldable means in engagement with the stem, said jaws being so arranged and constructed as to grip automatically the stem upon feed in one direction and automatically to release their grip on the stem upon feed in the reverse direction.

17. A chuck mechanism for connecting a drill stem to a feeding mechanism of a drilling apparatus, comprising chuck jaws mounted to grip the stem with a toggle action and held by yieldable means in engagement with the stem, said jaws being so arranged and constructed as to grip automatically the stem upon feed in one direction and automatically to release their grip on the stem upon feed in the reverse direction, and means for manually effecting release of the jaws from the stem by rendering said yieldable means ineffective.

18. In a chuck mechanism, a casing, parallel links pivotally mounted on said casing, chuck jaws having pivotal connection with and supported by said links, said link pivots and the points of pivotal connection between the links and jaws being so arranged as to provide for parallel motion movement of the jaws upon swinging of the links about their pivots, and jaw operating means connected to the ends of certain of the links remote from the link pivots for swinging said links to move said jaws into and out of gripping position, said operating means including a toggle arrangement which, when parts thereof are in a predetermined out-of-alinement relation, hold said jaws in their gripping position, said toggle arrangement including a toggle element pivotally connected to said casing, a member connected to certain of said links and having projecting arm portions, a block pivotally supported by the outer ends of said arm portions and having an opening through which said toggle element passes, and a spring encircling the toggle element and acting on said block for effecting a swinging of said links into a position to cause said jaws to grip.

19. In a chuck mechanism, a casing, means mounted on said casing providing a guideway at one side thereof, a support freely slidably mounted on said guideway for limited bodily movement, parallel links pivotally connected to said slidable support, chuck jaws carried by said links, and means for swinging said links.

20. In a chuck mechanism, a casing, means mounted on said casing providing a guideway at one side thereof, a support freely slidably mounted on said guideway for limited bodily movement, parallel links pivotally connected to said slidable support, chuck jaws carried by said links, one of said jaws being supported by said links nearer the link pivots than the other, and means for swinging said links.

HARRY C. JOHANSEN.